Figure 1:
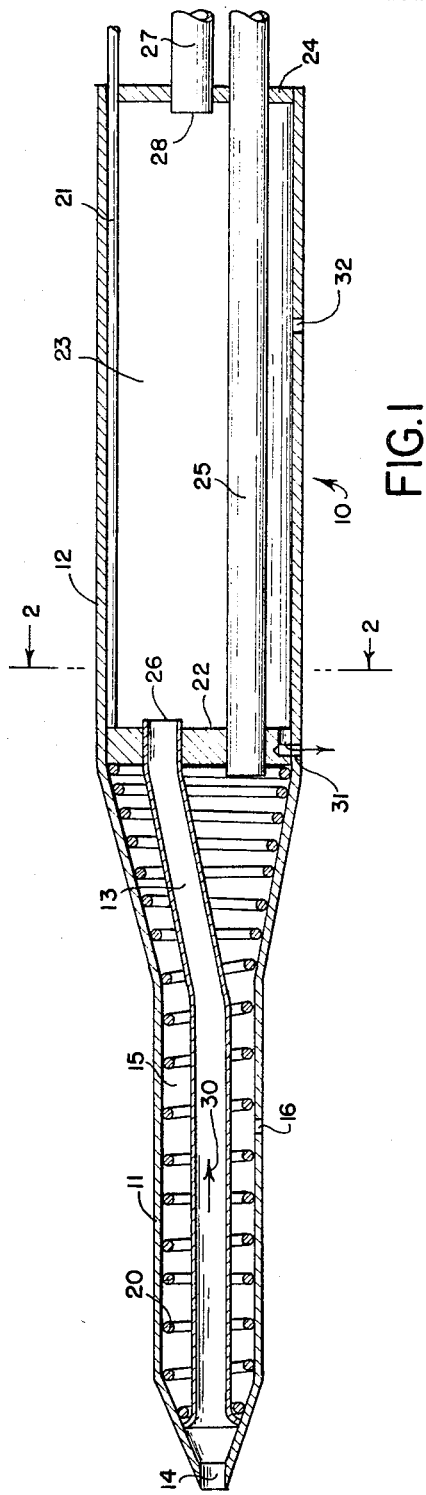

Aug. 23, 1966   F. D. WERNER ETAL   3,267,992
PITOT TUBE HAVING MEANS FOR REMOVING WATER FROM THE THE AIR
Filed May 6, 1963

INVENTORS
FRANK D. WERNER
RICHARD L. ENGLUND
WILLARD L. MOLINE
BY Dugger, Braddock, Johnson & Westman
ATTORNEYS United States Patent Office 3,267,992
Patented August 23, 1966

3,267,992
PITOT TUBE HAVING MEANS FOR REMOVING WATER FROM THE AIR
Frank D. Werner, Richard L. Englund, and Willard L. Moline, Minneapolis, Minn., assignors to Rosemount Engineering Company, Minneapolis, Minn., a corporation of Minnesota
Filed May 6, 1963, Ser. No. 278,353
6 Claims. (Cl. 165—2)

The present invention has relation to Pitot tubes and more particularly to a trap structure which will prevent condensation and freezing of water in remote portions of the Pitot tube.

The present invention relates equally to the Pitot system contained in a Pitot-static tube. For simplicity the term "Pitot tube" is used throughout this specification as applying to both "Pitot tubes" and "Pitot static tubes."

In this specification, remote portions of the Pitot tube are defined as the pneumatic pressure lines extending from the tube or the lines connecting thereto.

In the early development of the Pitot tube, water, in the form of rain, sleet or snow was introduced into the tube on an aircraft causing erroneous pressure inputs to the instruments utilizing the pressure from the Pitot tube. To overcome the difficulty caused of externally introduced solid or liquid particles of water the forward portion of the Pitot tube was heated and drain holes provided. As the art progressed, this heating was carried further and small chambers were provided to form a heated collection station for the water. In the more advanced forms, the chambers also were separately heated and great care was taken to make sure that the chamber remained above freezing temperature.

However, the problem of small droplets of water and water vapor in the air moving through the Pitot tube and condensing and freezing to the inner walls of the Pitot tube in the remote, cold portions thereof has continued to plague the aircraft industry. This effect is particularly pronounced where there may be a small leak in the tube or in the instrument itself. The small continuous flow will move the water vapor and droplets into the unheated zone. This water vapor can eventually condense, freeze and completely block the Pitot tube. The present invention combines a heated forward portion of the Pitot tube with a condensation chamber that has portions thereof as cold as the remote portions of the Pitot tube, thereby condensing the water vapor in the air. The water will then freeze and collect in the chamber and will not be carried into the remote portions of the Pitot tube.

It is an object of the present invention to present a Pitot tube having means thereon to prevent condensation and freezing of airborne water in remote portions of the tubes.

It is a further object of the present invention to provide a Pitot tube having a heated forward portion and a rear condensation chamber that is unheated.

It is a further object of the present invention to present a Pitot tube structure that prevents airborne water from freezing within Pitot tubes so as to obstruct the tube and cause erroneous pressure inputs to the instruments operated thereby.

Other and further objects are those inherent in the invention herein illustrated, described and claimed, and will become apparent as the description proceeds.

To the accomplishment of the foregoing and related ends, this invention then comprises features hereinafter fully described and particularly pointed out in the claims, the following description setting forth in detail certain illustrative embodiments of the invention, these being indicative, however of but a few of the various ways in which the principles of the invention may be employed.

Figure 2:
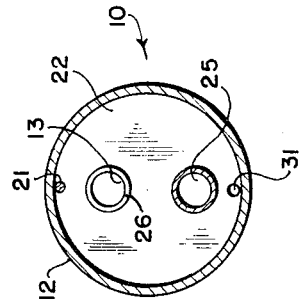

The invention is illustrated by reference to the drawings in which corresponding numerals refer to the same parts, and in which:

FIG. 1 is a longitudinal sectional view of a Pitot tube made according to the present invention; and FIG. 2 is a sectional view taken as on line 2—2 in FIG. 1.

Referring to the drawings and the numerals of reference thereon, a Pitot tube assembly 10 has a forward portion 11 and a rear condensation chamber portion 12. A forward portion 13 of a Pitot or dynamic pressure line is positioned within the forward portion 11 and has an orifice 14 opening forwardly. The outer shell of the forward portion 11 forms a chamber 15. A static line orifice 16 opens into chamber 15. The Pitot tube assembly can be mounted on the aircraft in any usual or preferred manner.

A heating coil 20 is helically wound around the interior surface of forward chamber 15 and a pair of leads 21 extend from the heating coil to a source of electrical power (not shown). The heating coil extends from the forward tip of the chamber 15 to a bulkhead 22, which divides the chamber 15 from a condensation chamber 23. The outer wall of rear portion 12 defines the condensation chamber 23, which extends from bulkhead 22 to a rear chamber wall 24. A static line 25 is open to chamber 15 and extends through the condensation chamber and out through the rear wall 24. The static line is not open to the chamber 23 in any way.

The forward portion of the Pitot tube 13 opens as at 26 into chamber 23. The tube 13 terminates closely adjacent the rear face of bulkhead 22 just inside the chamber 23. A continuation or extension 27 of the Pitot line has an open end portion 28 that extends through rear wall 24 of the condensation chamber 23. The end portion 28 terminates closely adjacent this rear wall.

The inlet orifice 14 faces in the direction of movement of the aircraft on which the tube is mounted and any air flow will be in the direction as indicated by arrow 30.

A first drain hole 31 is provided from chamber 23 through the wall of the condensation chamber 23 adjacent bulkhead 22. A rear drain hole 32 is also provided adjacent rear wall 24.

In operation there will be a small air flow in the direction as indicated by arrow 30. Whenever there is a change in pressure there is a corresponding flow inward or outward during the transient period when the pressure is changing. Also, there are usually small leaks that exist in the instrument tubing or the instruments themselves. This causes a small continuous movement of air in direction of arrow 30. In operation, with the heater working, the heating coil 20 maintains the Pitot tube forward portion 13 at a temperature well above the freezing point. Any water, either in the form of ice, droplets or water vapor is maintained above the freezing point and the air flow will carrying this water vapor and liquid toward the rear and out opening 26 into the unheated condensation chamber. In this specification the word water is intended to include water vapor, liquid water and ice.

The condensation chamber 23 is elongated and is not heated. The bulkhead 22 conducts enough heat from the coil 20 so that it is insured that the entire forward portion 13 of the Pitot tube is above freezing. When the air enters the condensation chamber it is cooled. The rear portions of the chamber against and adjacent the rear wall 24 are at a temperature that is as low as any remote portion of the extension 27 of the Pitot line. The rear portions of the condensation chamber are below the freezing point of water when the aircraft is operating at high altitudes or in cold weather. The air flows toward rear wall 24 toward the open end 28 of the extension 27 of the Pitot line. The axis of the rear opening is offset from the axis of the forward portion. The water vapor in the air will condense, as it cools in chamber 23, form droplets and will freeze against the rear wall 24 or against the rear portions of the side wall of the chamber. The small droplets suspended in the air flow will also freeze against the cold rear portions of the condensation chamber.

In previous devices that utilized only a "water trap" in the Pitot line, the trap was heated also. This permitted the water vapor in the air to remain in vapor form and be carried into the Pitot tube extension where, in the remote colder portions of the tube, the water would condense, freeze and block the tube.

The same is true with very small droplets of water which would be suspended in the stream of air flow. With the rear portions of the condensation chamber 23 unheated, these droplets will freeze and be removed from the air during ambient icing conditions.

The forward or first drain hole 31 is also maintained above the freezing point and any water in the condensation chamber can drain out through this heated port during flight. The other particles of ice and frost which may form on the rear wall 24 and the walls of the chamber 23 will remain in solid form until the chamber has been warmed to be above the freezing point of water. At this time the water can drain out through the rear hole 32 as well as the forward hole 31.

It is of critical importance that the rear portions of the condensation chamber are sufficient distance from the heated portions of the Pitot tube so that the air passing through the rear portions will be cooled before it enters the extension 27 of the Pitot tube.

In this manner water vapor and small droplets which are carried in the air flow will be trapped in the condensation chamber before they can enter the rear portions or extension 27 of the Pitot tube.

The static line is not affected by the operation of the condensation chamber as the static line extends through the chamber and does not open into it.

What is claimed is:
1. A Pitot tube comprising:
    an outer shell,
    a tubular forward portion of relatively small diameter mounted in said outer shell,
    a cylindrical chamber having front and rear walls formed in said outer shell, and being of substantially greater transverse dimension than said tubular forward portion, said tubular forward portion opening through said front wall into said chamber,
    a rear tubular portion of relatively small diameter located partially within said outer shell and opening from said chamber through said rear wall at a position remote from the forward portion, and
    heating means mounted within said outer shell for maintaining the entire forward portion of said tube at a temperature above the freezing point of water, the rear portion of said chamber being substantially unaffected by said heating means and remaining at a temperature substantially as low as the temperature of the coldest part of the rear tubular portion of said Pitot tube.
2. A Pitot tube comprising:
    an outer shell,
    a first tube of relatively small diameter in a forward portion of said outer shell,
    a bulkhead in said shell dividing said forward shell portion from a rear chamber of substantially greater transverse dimension than said first tube, said first tube passing through said bulkhead and opening into said chamber at a point adjacent said bulkhead,
    a rear wall terminating said chamber and positioned in said shell substantially parallel to and remotely spaced from said bulkhead,
    a second tube leading from said chamber and opening through the said rear wall thereof, and
    electrical heating means mounted within said forward shell portion for maintaining the entire first tube at a temperature above the freezing point of water, the rear wall of said chamber being spaced from said bulkhead at a distance sufficient to prevent any significant transfer of heat from said electrical heating means to said rear wall.
3. The method of removing water from the air carried in Pitot tubes for aircraft comprising the steps of:
    heating the air in the entry portion of said Pitot tube above the freezing point of water,
    moving the air from said entry portion to a chamber having a transverse dimension substantially greater than the entry portion of the tube,
    allowing the air in said chamber to cool to a level substantially as low as the coldest part of any portion of said Pitot tube and any extension thereof, and
    allowing the cooled air to enter an extension portion of said Pitot tube that is of substantially smaller diameter than the chamber.
4. The method as specified in claim 3 including the further step of draining the water collected in said chamber.
5. A Pitot tube comprising:
    an outer shell,
    a tubular forward portion of relatively small diameter mounted in said outer shell,
    a chamber formed in said outer shell of substantially greater transverse dimension than said tubular forward portion, said tubular forward portion opening into said chamber,
    a rear tubular portion of relatively small diameter located partially within said outer shell and opening from said chamber at a position remote from the forward portion,
    heating means mounted in said outer shell for maintaining the entire forward portion of said tube at a temperature above the freezing point of water, the rear portion of said chamber being substantially unaffected by said heating means and remaining at a temperature substantially as low as the temperature of the coldest part of said Pitot tube, and
    a heat conductive bulkhead in said outer shell separating the forward heated portion of said Pitot tube from the chamber, said tubular forward portion passing through said bulkhead and opening into said chamber at a point adjacent said bulkhead,
    said bulkhead and said shell being provided with a drain hole leading from the chamber through the bulkhead and out through the outer shell to the atmosphere.
6. A Pitot tube comprising:
    an outer shell,
    a first tube of relatively small diameter in a forward portion of said outer shell,
    a heat conductive bulkhead in said shell dividing said forward shell portion from a rear chamber of substantially greater transverse dimension than said first tube, said first tube passing through said bulkhead and opening into said chamber at a point adjacent said bulkhead,
    a rear wall terminating said chamber and positioned in said shell substantially parallel to and remotely spaced from said bulkhead, a second tube leading from said chamber and opening through the said rear wall thereof, and electrical heating means mounted within said forward shell portion for maintaining the entire first tube at a temperature above the freezing point of water, the rear wall of said chamber being spaced from said bulkhead at a distance sufficient to prevent any significant transfer of heat from said electrical heating means to said rear wall, said bulkhead and outer shell being provided with a drain hole leading from the chamber through the bulkhead and outer shell to the atmosphere.

References Cited by the Examiner

UNITED STATES PATENTS

| | | | |
|---|---|---|---|
| 2,482,701 | 9/1949 | Anderson | 73—212 |
| 2,510,986 | 6/1950 | Larkin | 73—212 |
| 2,984,107 | 5/1961 | Strieby et al. | 73—212 |
| 3,030,807 | 4/1962 | Scadron | 73—212 |
| 3,097,528 | 7/1963 | Mohring | 73—212 |

ROBERT A. O'LEARY, *Primary Examiner.*

CHARLES SUKALO, *Examiner.*

N. R. WILSON, *Assistant Examiner.*